Jan. 1, 1974 G. COMPARE 3,782,942

METHOD FOR PREPARING ARTWORK TO BE USED IN MANUFACTURING OF PRINTED CIRCUITS

Filed June 7, 1968 2 Sheets-Sheet 1

BY George V. Eltgroth and Joseph B. Forman
ATTORNEYS FOR INVENTOR.

Giampiero COMPARE

BY George V. Eltgroth and Joseph B. Forman
ATTORNEYS FOR INVENTOR.

Giampiero COMPARE

United States Patent Office 3,782,942

Patented Jan. 1, 1974

3,782,942
METHOD FOR PREPARING ARTWORK TO BE USED IN MANUFACTURING OF PRINTED CIRCUITS

Giampiero Compare, Milan, Italy, assignor to General Electric Information Systems S.p.A., Caluso, Turin, Italy Filed June 7, 1968, Ser. No. 735,462
Claims priority, application Italy, June 8, 1967, 16,967/67, Patent 816,880
Int. Cl. G03c 5/04
U.S. Cl. 96—41 2 Claims

ABSTRACT OF THE DISCLOSURE

This invention relates to a method for preparing artwork to be used in manufacturing of printed circuits. The novelty resides in the provision of optical reference means on a plurality of masks and a photosensitive member which permits precision alignment of the masks relative to a photosensitive member.

The present invention relates to a method for obtaining high precision photographic artwork, such as is illustrated in the copending patent application Ser. No. 704,658 filed Feb. 12, 1968 by applicant, now U.S. Pat. No. 3,594,168.

In this patent application a new method for obtaining photographic artwork for printed circuits is disclosed, the method consisting in obtaining the artwork by means of a succession of exposures to a proper light source of a photographic plate put subsequently in contact with different high precision partial masks, and by the use of auxiliary masking means specific to each printed circuit design. Each exposure causes a latent image of part of the circuit to be imprinted on the plate. The plate is afterward developed in a single operation, thus resulting in the final complete artwork. In using this method it is necessary to assure a high degree of precision in the positioning of the different partial masks relative to the artwork plate. According to the above identified patent application this was obtained by mechanical reference means, which are, however, in some cases unable to give satisfying results.

According to the present invention, optical reference means are provided, both on the masking means and on the artwork plate, the latter being obtained by exposing said plate to light through a first masking means, generating a precise image of the optical reference means, and developing the artwork plate only in the region comprising said images, thereafter said developed images are used as optical reference means in co-operation with other co-ordinated reference means provided in the masking means used in the subsequent exposures.

These and other features and advantages of the invention will appear more clearly from the following detailed description of an illustrative embodiment thereof, with reference to the accompanying drawings, wherein.

Figure 1:
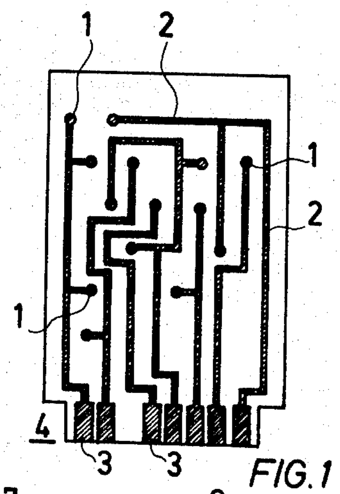
FIG. 1 shows a typical printed circuit for integrated circuits.

FIG. 1 shows a typical printed circuit adapted for accommodating integrated circuit units. It includes three different conductive elements which are distinguished as "lands" 1, circular in shape and perforated to accommodate the connection leads of the integrated units; narrow rectilinear "wiring conductors" 2 arranged in two mutually perpendicular directions; and "connecting pads" 3 which form the "connector" 4.

As has been shown in the cited copending application, the degree of precision required for the position of the "lands" is greater than the one required for the other elements, and therefore the exposure of the artwork plate to obtain the latent images of the lands requires the use of a high precision master mask, as for example, a rigid and indeformable steel plate which is perforated with very high precision to correspond to all potential land positions.

Figure 2:
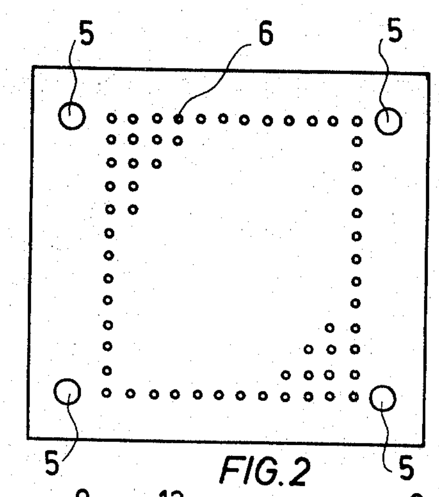
FIG. 2 shows a precision mask provided with master optical reference means.

FIG. 2 shows this steel plate formed in conformity with the present invention. In addition to the holes 6 corresponding to potential land positions, it also includes at least two, and preferably four, master optical reference means 5 in the form of circular holes having a comparatively large diameter. They are located at marginal portions of the plate, preferably near the corner thereof.

According to a preferred embodiment of the present invention, this perforated plate is not used as a proper mask, but as a master mask from which photographic mask plates, having substantially the same high degree of precision as the master mask, may be obtained. This is made by exposing a photographic plate in contact with the perforated plate. This photographic plate may be of the invertible type, that is, of a type whereby, after development, the resulting image is positive.

This means that the regions of the plate which were subject to the action of the light are transparent, whereas the remainder of the plate is opaque.

It is obvious that the same result may be obtained by subsequently contact printing two photographic plates of normal type, whereby the first one will produce a negative image, and the second, exposed through the first one, will produce a positive image. In any case this photographic mask plate will show, as transparent regions, the images of all the holes 6 of the master mask, and will also show the circuit areas which are the images of the master optical reference means 5.

Figure 3:
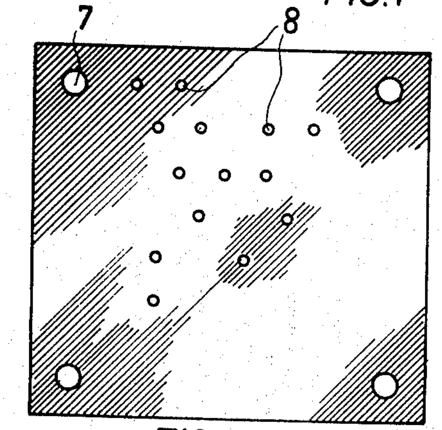
FIG. 3 shows a photographic plate used as partial masking means, and provided with optical reference means.

A practically unlimited number of such positive photographic plates may afterward be adapted to the proper design of specific printed circuits, by applying opaque paint on the images of the holes 6 which do not correspond to lands to be provided in each specific printed circuit. A photographic plate so prepared is used as a partial mask for determining the land positions in the printed circuit, and is represented in FIG. 3 as transparent areas for the images 8 of the wanted lands only, and the images of the optical reference means 7.

This partial mask is superposed to the artwork plate, that is, to the plate which, at the end of the process, will result in the required artwork for the specific circuit.

Figure 5:
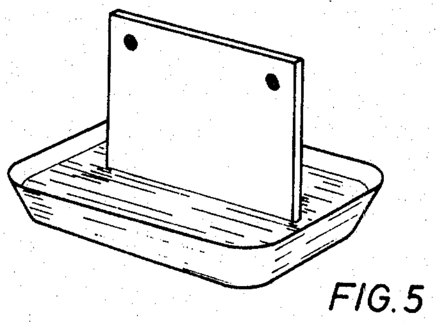
FIG. 5 shows how the development operation can be limited to the lateral regions containing the images of the reference means.

The assembly of the partial mask and of the artwork plate is exposed to the action of a proper light source, the emulsioned surfaces of both plates being in mutual contact. This will cause the formation, on the artwork plate, of latent images of the lands and of the optical reference means. Thereafter, only the marginal strips of the artwork plate, which contain the latent images of the optical reference means, are subjected to a developing and fixing operation, for instance by immersing the opposite borders of the plates, in succession, first in a developing and then in a fixing bath of proper depth, as is shown in FIG. 5.

During this operation the plate must not be exposed to activating light, that is to light capable of causing photographic effects on the plate.

Figure 4:
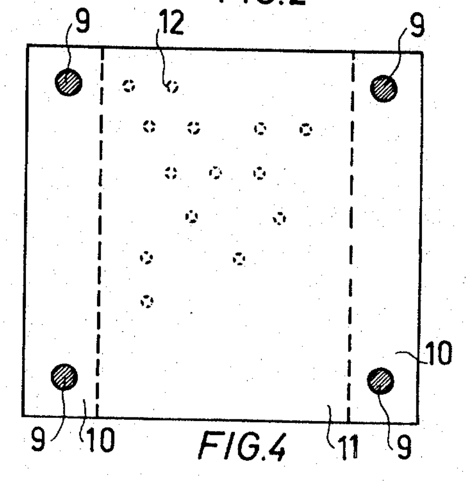
FIG. 4 shows the artwork plate in a first phase of the operation.

As a result of these operations, the artwork plate will appear as shown in FIG. 4, the optical reference means appearing as opaque disks on transparent background on the border strips 10. The central portion is undeveloped, and carries the latent images 12 of the wanted lands. At this time the latent images of the wiring conductors, and of the connecting pads, must be imprinted on the plate in precise relationship to the existing latent images of the lands.

The master masks for the wiring conductors and connection pads may be obtained, either by using metallic plates having longitudinal slits, or by operating by means of the apparatus called coordinatograph on "cut-and-strip" plastic sheets thereby removing the overlay of opaque material from predetermined regions of a transparent support as explained in the referenced copending application. In any event, the master mask will also have, in proper positions, transparent regions in form of disks corresponding in diameter, position and precision with the optical reference provided in the master mask relating to the lands. By contact printing of reversible photographic plates the desired number of photographic masks are obtained from the conductor master mask, these photographic masks being formed with the same precision as the master mask: accordingly, they will show the images of the wiring conductors as transparent areas on opaque background, corresponding in position and width, with the set of wiring conductors of the printed circuit along one predetermined direction, and preferably including the images of the potential connecting pads. In addition, they also will carry transparent circular areas corresponding in position, diameter and precision, with the optical reference means of the conductor master mask.

Each one of these photographic masks may be adapted to a specific printed circuit design by applying opaque paint on the portions of the transparent parallel strips corresponding to portions of wiring conductor or with connection pads which are not included in the specific printed circuit.

Figure 6:
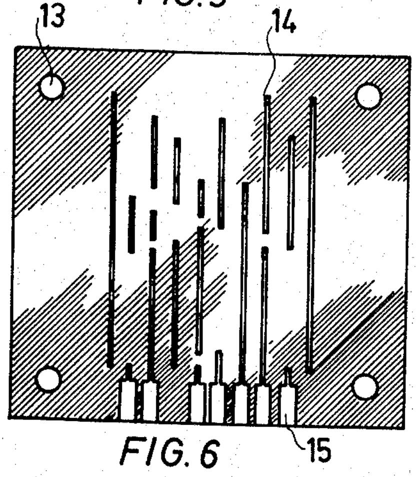
FIG. 6 shows another partial masking means used in a subsequent phase of operation.

FIG. 6 shows a photographic mask, comprising the transparent images of the vertical wiring conductors and the connecting pads for the printed circuit represented in FIG. 1.

The description of the following operation, intended to imprint latent images of the wiring conductors and of the connecting pads on the artwork plate, where the latent images of the lands are already present, will illustrate the function of the optical reference means.

Figure 7:
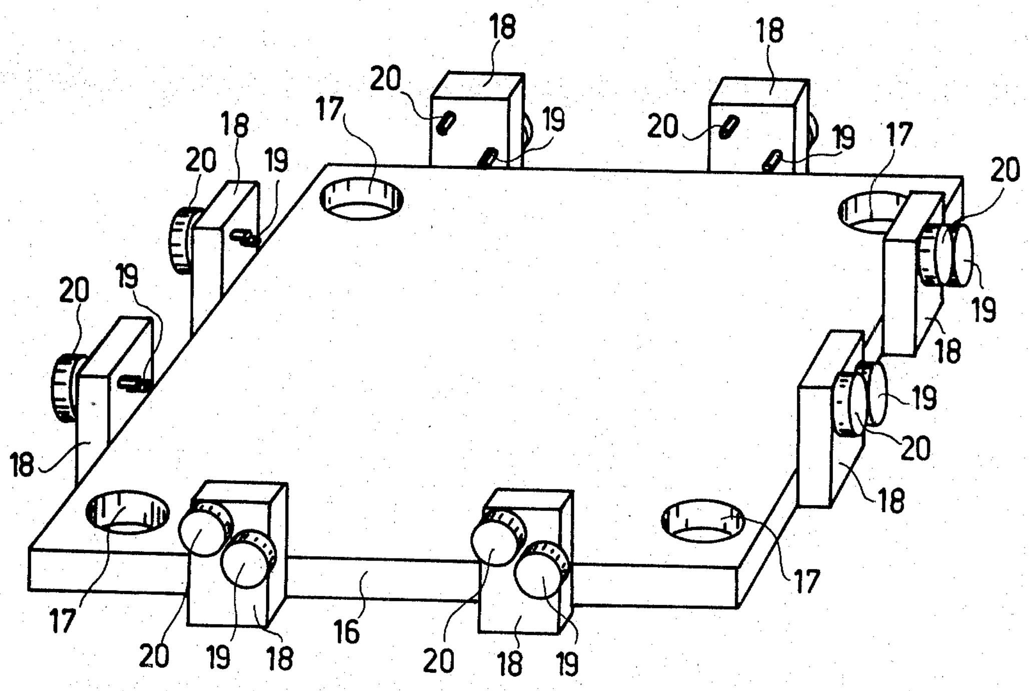
FIG. 7 shows a registration device.

FIG. 7 represents a registration tool used for this operation. It essentially includes a plate 16 which includes, at its corners, the holes 17 in a position corresponding to the position of the reference means of the artwork and of the photographic mask. These holes have a diameter substantially larger than the diameter of the optical reference means, but not so large as to invade the region of the artwork plate reserved for the design of the printed circuit.

A convenient number of upright supports 18, carrying micrometer screws 19 and 20, are fixed to the borders of the plate 16. The artwork plate and the photographic mask are superimposed upon the base plate. The micrometric screws 19 and 20 are located at different heights, in such a way, that the lower screws 19 may act on the sides of the artwork plate, and the screws 20 may act on the sides of the masking plate, thus allowing both plates to be subjected to micrometric displacements under the control of the screws 19 and 20.

The underlying artwork plate and the superimposed photographic mask have the emulsion-covered surfaces in mutual contact.

A source of inactinic light, situated under the plate 16, illuminates, through the holes 17, the regions where the opaque reference means of the artwork plate and the transparent reference means of the photographic mask are located. If the mask is not exactly superimposed to the artwork plate, the position of the transparent reference means of the masking plate will not coincide precisely with the position of the opaque reference means of the artwork plate and the light passing therethrough will reveal the inexactitude of the relative positions. By micrometric displacements of the photographic mask, and/or the artwork plate, the positions of both reference means may be made to perfectly coincide, by practically eliminating any passage of the inactinic light. When this condition is reached, photographic mask and artwork plate are in exact reciprocal position, any possible discrepancy being of a few microns. In this condition the artwork plate is exposed to the actinic light, through the photographic mask, thus causing latent images of the wiring conductors and of the connecting pads to be imprinted on the artwork plate.

Following this, a second exposure of the same artwork plate is effected through another photographic mask carrying the design of the wiring conductors in a direction perpendicular to the direction of the former one. This photographic mask is prepared exactly as the preceding photographic mask and carries identical and identically situated optical reference means. As the last operation, the artwork plate is developed, resulting in the final artwork.

A number of variants to the described process may be thought of, without departing from the spirit and scope of the invention. For example, the optical reference means may be first exposed and developed on the unexposed artwork plate, thus permitting one to proceed to the sequence of operation for imprinting the different sets of latent images without interruption.

Figure 8:
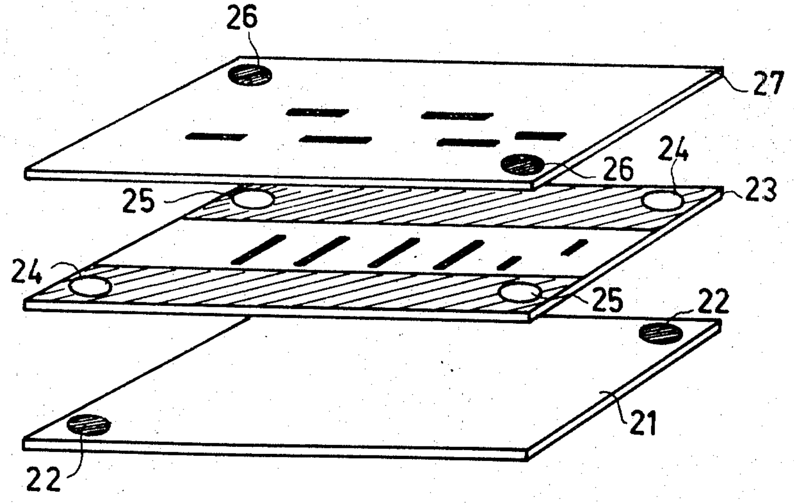
FIG. 8 shows a variant of the method according to the invention.

Obviously, more than two plane optically transparent sheets or plates may be superimposed with high precision using an adequate combination of alternate transparent and opaque reference means. For example, if an artwork plate 21 (FIG. 8), should be imprinted with the images existing on two distinct and superimposed masks, 23 and 27, the disposition shown in FIG. 8 may be used. The artwork carries two optical reference means in form of opaque disks, on two diagonally opposed corners, the remaining portion of the developed lateral regions being transparent. The first mask 23 immediately superimposed to the artwork plate, carries, at its four corners, four reference means in the form of four transparent disks on the opaque background of the lateral regions. Two such reference means 24 oppositely situated along a first diagonal line, cooperate with the opaque reference means of the artwork 21 to precisely determine the position of the first mask with respect to the artwork plate, whereas the remaining disk 25 oppositely situated along the other diagonal line will be used to position the second mask. This second mask will be so prepared, as to have two reference means situated along said other diagonal line in the form of two opaque disks at the corners corresponding to the corners not occupied by the reference means 22 of the artwork 21. These opaque disks 26 cooperate with the transparent disks 25 of the first mask, to precisely position the second mask 27 with respect to the first one and to the artwork.

If the transparent optical reference means on the master mask are obtained, as explained in the example set forth, by operations carried on by the coordinatograph on "cut-and-strip" sheets, or by any other manual operation it may be convenient to cut out such transparent reference means as disks having a diameter slightly greater than the opaque reference means of the artwork. Thus, the condition by which the mask is perfectly registrated with respect to the artwork will be revealed by the presence of a very thin illuminated circular corona, having a uniform width, equal to the difference between the radius of the opaque disk on the artwork and that of the transparent disk on the mask. This arrangement prevents any uncertainty in the complementary position of mask and plate, which could result if the opaque disk had a diameter slightly larger than the diameter of the transparent disk.

The process according to the invention may be advantageously used not only for the described purpose, but any time a complex photographic image is desired from the precise superposition of more than one partial mask, as may be the case of graphical composition, of photomontages having advertising, artistic or scientific purposes, or in case of cinematographic animate strips.

What is claimed:

1. A method for obtaining photographic artwork for printed circuits utilizing first and second masks having respective first and second different printed circuit pattern portions, both of said masks having optical registration reference patterns of transparent and opaque areas comprising the steps of: exposing a photosensitive member to the first circuit pattern portion and said reference patterns of said first mask to provide a latent image of said first circuit pattern portion on a predetermined area of said member and to provide latent images of said reference patterns, developing only the part of said photosensitive member that contains said latent images of said reference patterns to provide visible images of said reference patterns, aligning said reference patterns of said second mask with said visible images on said photosensitive member to superpose said second circuit pattern portion on said predetermined area, and exposing said photosensitive member to the second circuit pattern portion of said second mask to provide a latent image of said second circuit pattern portion which connects with said latent image of said first circuit pattern portion.

2. The method of claim 1 wherein the step of aligning said reference patterns of said second mask with said visible images on said photosensitive member comprises the steps of:

illuminating the visible images on said photosensitive member, and positioning the second mask with respect to the photosensitive member by superimposing the optical registration reference pattern of said second mask over the illuminated visible images on said photosensitive member.

References Cited

UNITED STATES PATENTS

| | | | |
|---|---|---|---|
| 1,181,163 | 5/1916 | Pilkington | 96—Reg. Dig. |
| 3,288,045 | 11/1966 | Harding | 96—36.2 U X |
| 3,385,702 | 5/1968 | Koehler | 96—36.2 |
| 3,461,566 | 8/1969 | Gerstner | 96—36.2 X |

OTHER REFERENCES

Rudge et al.: Fly's-Eye Lens Technique . . . Pub. in I.B.M. Jnl. of R. & D., vol. 7, April 1963, only pp. 146, 149 and 150 made of record.

DAVID KLEIN, Primary Examiner

U.S. Cl. X.R.

96—36.2